(12) United States Patent
Tucker et al.

(10) Patent No.: US 10,160,276 B2
(45) Date of Patent: Dec. 25, 2018

(54) CONTACTLESS SENSING OF A FLUID-IMMERSED ELECTRIC MOTOR

(71) Applicant: Levant Power Corporation, Woburn, MA (US)

(72) Inventors: Clive Tucker, Charlestown, MA (US); Vladimir Gorelik, Medford, MA (US); Jonathan R. Leehey, Wayland, MA (US); Robert Driscoll, Derry, NH (US); Colin Patrick O'Shea, Cambridge, MA (US); Johannes Schneider, Cambridge, MA (US); Ross J. Wendell, Medford, MA (US); Tyson David Sawyer, Mason, NH (US)

(73) Assignee: ClearMotion, Inc., Billerica, MA (US)

(*) Notice: Subject to any disclaimer, the term of this patent is extended or adjusted under 35 U.S.C. 154(b) by 613 days.

(21) Appl. No.: 14/242,612

(22) Filed: Apr. 1, 2014

(65) Prior Publication Data
US 2014/0294625 A1    Oct. 2, 2014

Related U.S. Application Data

(63) Continuation of application No. PCT/US2014/029654, filed on Mar. 14, 2014.
(Continued)

(51) Int. Cl.
*B60G 17/00* (2006.01)
*B60G 17/018* (2006.01)
(Continued)

(52) U.S. Cl.
CPC ............ *B60G 17/00* (2013.01); *B60G 11/265* (2013.01); *B60G 17/015* (2013.01);
(Continued)

(58) Field of Classification Search
CPC ................ F04D 14/08; F04D 2240/81; F04D 2270/052; F04D 14/082; B60G 17/0155; B60G 17/018; B60G 17/019
(Continued)

(56) References Cited

U.S. PATENT DOCUMENTS

| 998,128 A | 7/1911 | Smith |
| 1,116,293 A | 11/1914 | Kane |

(Continued)

FOREIGN PATENT DOCUMENTS

| CN | 1325799 A | 12/2001 |
| CN | 1370926 A | 9/2002 |

(Continued)

OTHER PUBLICATIONS

Kaminaga et al., Mechanism and Control of knee power augmenting device with backdrivable electro-hydrostatic actuator. 13th World congress Mechanism Machine Science. Jun. 19-25, 2011. 1-10.
(Continued)

*Primary Examiner* — Patrick Hamo
*Assistant Examiner* — Christopher Bobish
(74) *Attorney, Agent, or Firm* — Wolf, Greenfield & Sacks, P.C.

(57) ABSTRACT

A method and system for measuring rotor position or velocity in an electric motor disposed in hydraulic fluid. The system comprises a contactless position sensor that measures electric motor rotor via magnetic, optical, or other means through a diaphragm that is permeable to the sensing means but impervious to the hydraulic fluid. An electronic sensor is positioned outside the operating fluid, whereas the motor is located in the fluid volume.

5 Claims, 5 Drawing Sheets

Related U.S. Application Data (60) Provisional application No. 61/913,644, filed on Dec. 9, 2013, provisional application No. 61/865,970, filed on Aug. 14, 2013, provisional application No. 61/815,251, filed on Apr. 23, 2013, provisional application No. 61/789,600, filed on Mar. 15, 2013, provisional application No. 61/930,452, filed on Jan. 22, 2014.

(51) Int. Cl.
*B60G 17/019* (2006.01)
*H02K 5/12* (2006.01)
*B60G 11/26* (2006.01)
*B60G 17/015* (2006.01)
*B60G 17/0195* (2006.01)
*H02K 29/08* (2006.01)
*H02K 7/14* (2006.01)
*H02K 7/18* (2006.01)
*B60G 17/08* (2006.01)
*H02P 6/16* (2016.01)
*H02K 29/10* (2006.01)
*H02K 11/215* (2016.01)
*H02K 11/22* (2016.01)
*H02K 11/33* (2016.01)

(52) U.S. Cl.
CPC ......... *B60G 17/018* (2013.01); *B60G 17/019* (2013.01); *B60G 17/0152* (2013.01); *B60G 17/0195* (2013.01); *H02K 5/12* (2013.01); *H02K 7/14* (2013.01); *H02K 7/1823* (2013.01); *H02K 29/08* (2013.01); *B60G 17/08* (2013.01); *B60G 2400/90* (2013.01); *H02K 11/215* (2016.01); *H02K 11/22* (2016.01); *H02K 11/33* (2016.01); *H02K 29/10* (2013.01); *H02P 6/16* (2013.01)

(58) Field of Classification Search
USPC .................. 417/410.4, 410.3; 280/5.52
See application file for complete search history.

(56) References Cited

U.S. PATENT DOCUMENTS

| | | |
|---|---|---|
| 1,290,293 A | 1/1919 | Morski |
| 2,194,530 A | 3/1940 | Torstensson |
| 2,885,202 A | 5/1959 | Trumper et al. |
| 2,958,292 A | 11/1960 | Lipe et al. |
| 3,507,580 A | 4/1970 | Howard et al. |
| 3,515,889 A | 6/1970 | Kammerer |
| 3,559,027 A | 1/1971 | Arsem |
| 3,610,611 A * | 10/1971 | Elliott ................ B60G 17/0155 267/64.18 |
| 3,688,859 A | 9/1972 | Hudspeth et al. |
| 3,800,202 A | 3/1974 | Oswald |
| 3,803,906 A | 4/1974 | Ross |
| 3,805,833 A | 4/1974 | Teed |
| 3,921,746 A | 11/1975 | Lewus |
| 3,947,004 A | 3/1976 | Taylor |
| 4,032,829 A | 6/1977 | Schenavar |
| 4,033,580 A | 7/1977 | Paris |
| 4,216,420 A | 8/1980 | Jinbo et al. |
| 4,295,538 A | 10/1981 | Lewus |
| 4,401,926 A | 8/1983 | Morton et al. |
| 4,480,709 A | 11/1984 | Commanda |
| 4,500,827 A | 2/1985 | Merritt et al. |
| 4,606,551 A | 8/1986 | Toti et al. |
| 4,625,993 A | 10/1986 | Williams et al. |
| 4,673,194 A | 6/1987 | Sugasawa |
| 4,729,459 A | 3/1988 | Inagaki et al. |
| 4,740,711 A | 4/1988 | Sato et al. |
| 4,815,575 A | 3/1989 | Murty |
| 4,857,755 A | 8/1989 | Comstock |
| 4,872,701 A | 10/1989 | Akatsu et al. |
| 4,887,699 A | 12/1989 | Ivers et al. |
| 4,936,423 A | 1/1990 | Karnopp |
| 4,908,553 A | 3/1990 | Hoppie et al. |
| 4,921,080 A | 5/1990 | Lin |
| 4,924,393 A | 5/1990 | Kurosawa |
| 4,924,674 A * | 5/1990 | Hara ....................... F01D 15/10 322/31 |
| 4,981,309 A | 1/1991 | Froeschle et al. |
| 5,034,890 A | 7/1991 | Sugasawa et al. |
| 5,046,309 A | 9/1991 | Yoshino et al. |
| 5,060,959 A | 10/1991 | Davis et al. |
| 5,091,679 A | 2/1992 | Murty et al. |
| 5,098,119 A | 3/1992 | Williams et al. |
| 5,102,161 A | 4/1992 | Williams |
| 5,145,206 A | 9/1992 | Williams |
| 5,183,127 A * | 2/1993 | Kageyama ......... B60G 17/0195 180/197 |
| 5,203,199 A | 4/1993 | Henderson et al. |
| 5,215,327 A | 6/1993 | Gatter et al. |
| 5,232,242 A | 8/1993 | Bachrach et al. |
| 5,243,525 A | 9/1993 | Tsutsumi et al. |
| 5,276,622 A | 1/1994 | Miller et al. |
| 5,291,960 A | 3/1994 | Brandenburg et al. |
| 5,295,563 A | 3/1994 | Bennett |
| 5,295,705 A | 3/1994 | Butsuen et al. |
| 5,337,560 A | 8/1994 | Abdelmalek et al. |
| 5,360,445 A | 11/1994 | Goldowsky |
| 5,377,791 A | 1/1995 | Kawashima et al. |
| 5,391,953 A | 2/1995 | Van de Veen |
| 5,425,436 A | 6/1995 | Teramura et al. |
| 5,480,186 A | 1/1996 | Smith |
| 5,529,152 A | 6/1996 | Hamilton et al. |
| 5,570,286 A | 10/1996 | Margolis et al. |
| 5,572,425 A | 10/1996 | Levitt et al. |
| 5,590,734 A | 1/1997 | Caires |
| 5,608,308 A | 3/1997 | Kiuchi et al. |
| 5,659,205 A | 8/1997 | Weisser et al. |
| 5,682,980 A | 11/1997 | Reybrouck et al. |
| 5,684,383 A | 11/1997 | Tsuji et al. |
| 5,701,245 A | 12/1997 | Ogawa et al. |
| 5,717,303 A | 2/1998 | Engel |
| 5,764,009 A | 6/1998 | Fukaya et al. |
| 5,794,168 A | 8/1998 | Sasaki et al. |
| 5,794,439 A | 8/1998 | Lisniansky |
| 5,839,800 A | 11/1998 | Koga et al. |
| 5,856,709 A | 1/1999 | Ibaraki et al. |
| 5,892,293 A | 4/1999 | Lucas |
| 5,925,951 A * | 7/1999 | Edwards ................ H02K 11/01 310/216.108 |
| 5,941,328 A | 8/1999 | Lyons et al. |
| 5,944,153 A | 8/1999 | Ichimaru |
| 5,987,368 A | 11/1999 | Kamimae et al. |
| 5,999,868 A | 12/1999 | Beno et al. |
| 6,025,665 A | 2/2000 | Poag |
| 6,049,746 A | 4/2000 | Southward et al. |
| 6,092,618 A | 7/2000 | Collier-Hallman |
| 6,111,375 A | 8/2000 | Zenobi |
| 6,161,844 A * | 12/2000 | Charaudeau ....... B60G 17/0157 280/124.1 |
| 6,190,319 B1 | 2/2001 | Goldowsky |
| 6,227,817 B1 | 5/2001 | Paden |
| 6,282,453 B1 | 8/2001 | Lombardi |
| 6,290,034 B1 | 9/2001 | Ichimaru |
| 6,314,353 B1 | 11/2001 | Ohsaku et al. |
| 6,349,543 B1 | 2/2002 | Lisniansky |
| 6,394,238 B1 | 5/2002 | Rogala |
| 6,441,508 B1 | 8/2002 | Hylton |
| 6,452,535 B1 | 9/2002 | Rao et al. |
| 6,519,939 B1 | 2/2003 | Duff |
| 6,559,553 B2 | 5/2003 | Yumita |
| 6,575,484 B2 | 6/2003 | Rogala et al. |
| 6,592,060 B1 | 7/2003 | Vomhof et al. |
| 6,631,960 B2 | 10/2003 | Grand et al. |
| 6,765,389 B1 | 7/2004 | Moore |
| 6,876,100 B2 | 4/2005 | Yumita |
| 6,908,162 B2 | 6/2005 | Obayashi et al. |
| 6,920,951 B2 | 7/2005 | Song et al. |

(56) References Cited

U.S. PATENT DOCUMENTS

| | | |
|---|---|---|
| 6,944,544 B1 | 9/2005 | Prakah-Asante et al. |
| 6,952,060 B2 | 10/2005 | Goldner |
| 6,964,325 B2 | 11/2005 | Maes |
| 6,973,880 B2 | 12/2005 | Kumar |
| 7,015,594 B2 | 3/2006 | Asada |
| 7,023,107 B2 | 4/2006 | Okuda et al. |
| 7,034,482 B2 | 4/2006 | Komiyama et al. |
| 7,051,526 B2 | 5/2006 | Geiger |
| 7,087,342 B2 | 8/2006 | Song |
| 7,195,250 B2 | 3/2007 | Knox et al. |
| 7,206,678 B2 | 4/2007 | Arduc et al. |
| 7,335,999 B2 | 2/2008 | Potter |
| 7,336,002 B2 | 2/2008 | Kato et al. |
| 7,392,998 B2 | 7/2008 | Runkel |
| 7,513,490 B2 | 4/2009 | Robertson |
| 7,533,890 B2 | 5/2009 | Chiao |
| 7,656,055 B2 | 2/2010 | Torres et al. |
| 7,722,056 B2 | 5/2010 | Inoue et al. |
| 7,854,203 B2 | 12/2010 | Kumar |
| 7,896,360 B2 * | 3/2011 | Buma ............... B60G 17/0161 280/5.502 |
| 7,938,217 B2 | 5/2011 | Stansbury |
| 7,963,529 B2 * | 6/2011 | Oteman ............... B60G 13/001 188/266 |
| 8,063,498 B2 | 11/2011 | Namuduri et al. |
| 8,067,863 B2 | 11/2011 | Giovanardi |
| 8,079,436 B2 | 12/2011 | Tikkanen et al. |
| 8,080,888 B1 | 12/2011 | Daley |
| 8,255,117 B2 | 8/2012 | Bujak et al. |
| 8,269,359 B2 | 9/2012 | Boisvert et al. |
| 8,269,360 B2 | 9/2012 | Boisvert et al. |
| 8,376,100 B2 | 2/2013 | Avadhany et al. |
| 8,380,416 B2 | 2/2013 | Offerle et al. |
| 8,392,030 B2 | 3/2013 | Anderson et al. |
| 8,453,809 B2 | 6/2013 | Hall |
| 8,471,418 B2 * | 6/2013 | Yamasaki ............ B62D 5/0406 310/68 R |
| 8,475,137 B2 | 7/2013 | Kobayashi et al. |
| 8,548,678 B2 | 10/2013 | Ummethala et al. |
| 8,590,679 B2 | 11/2013 | Hall |
| 8,596,055 B2 | 12/2013 | Kadlicko |
| 8,672,337 B2 | 3/2014 | van der Knaap et al. |
| 8,776,961 B2 | 7/2014 | Mori et al. |
| 8,820,064 B2 | 9/2014 | Six et al. |
| 8,839,920 B2 | 9/2014 | Bavetta et al. |
| 8,840,118 B1 | 9/2014 | Giovanardi et al. |
| 8,841,786 B2 | 9/2014 | Tucker et al. |
| 8,892,304 B2 | 11/2014 | Lu et al. |
| 8,966,889 B2 | 3/2015 | Six |
| 9,035,477 B2 | 5/2015 | Tucker et al. |
| 9,260,011 B2 | 2/2016 | Anderson et al. |
| 9,550,404 B2 | 1/2017 | Giovanardi et al. |
| 2001/0033047 A1 | 10/2001 | Beck et al. |
| 2002/0047273 A1 | 4/2002 | Burns et al. |
| 2002/0060551 A1 | 5/2002 | Ikeda |
| 2002/0070510 A1 | 6/2002 | Rogala |
| 2002/0074175 A1 | 6/2002 | Bloxham |
| 2002/0145404 A1 | 10/2002 | Dasgupta et al. |
| 2002/0183907 A1 | 12/2002 | Stiller |
| 2003/0000765 A1 | 1/2003 | Spadafora |
| 2003/0034697 A1 | 2/2003 | Goldner et al. |
| 2003/0077183 A1 | 4/2003 | Franchet et al. |
| 2003/0150352 A1 | 8/2003 | Kumar |
| 2003/0169048 A1 | 9/2003 | Kim et al. |
| 2004/0096334 A1 | 5/2004 | Aldinger et al. |
| 2004/0119289 A1 | 6/2004 | Zabramny |
| 2004/0207350 A1 | 10/2004 | Wilton et al. |
| 2004/0212273 A1 | 10/2004 | Gould |
| 2005/0280318 A1 | 12/2005 | Parison et al. |
| 2006/0178808 A1 | 8/2006 | Wu et al. |
| 2006/0239849 A1 | 10/2006 | Heltzapple et al. |
| 2007/0018626 A1 | 1/2007 | Chi |
| 2007/0088475 A1 | 4/2007 | Nordgren et al. |
| 2007/0089919 A1 | 4/2007 | de la Torre et al. |
| 2007/0089924 A1 | 4/2007 | de la Torre et al. |
| 2007/0120332 A1 | 5/2007 | Bushko et al. |
| 2007/0233279 A1 | 10/2007 | Kazerooni et al. |
| 2008/0004771 A1 | 1/2008 | Masamura |
| 2008/0012262 A1 | 1/2008 | Carabelli |
| 2008/0111324 A1 | 5/2008 | Davis |
| 2008/0190104 A1 | 8/2008 | Bresie |
| 2008/0234900 A1 | 9/2008 | Bennett |
| 2008/0238396 A1 | 10/2008 | Ng et al. |
| 2008/0257626 A1 | 10/2008 | Carabelli et al. |
| 2009/0015202 A1 | 1/2009 | Miura et al. |
| 2009/0060728 A1 * | 3/2009 | Grimes ............... F04B 7/06 415/200 |
| 2009/0192674 A1 | 7/2009 | Simons |
| 2009/0212649 A1 | 8/2009 | Kingman et al. |
| 2009/0230688 A1 | 9/2009 | Torres et al. |
| 2009/0234537 A1 | 9/2009 | Tomida et al. |
| 2009/0260935 A1 | 10/2009 | Avadhany et al. |
| 2010/0013229 A1 | 1/2010 | Da Costa |
| 2010/0044978 A1 | 2/2010 | Delorenzis et al. |
| 2010/0072760 A1 | 3/2010 | Bavetta et al. |
| 2010/0217491 A1 | 8/2010 | Naito et al. |
| 2010/0244457 A1 | 9/2010 | Bhat et al. |
| 2010/0262308 A1 | 10/2010 | Anderson et al. |
| 2010/0308589 A1 | 12/2010 | Rohrer |
| 2011/0024601 A1 | 2/2011 | Shoemaker et al. |
| 2011/0127127 A1 | 6/2011 | Hirao et al. |
| 2011/0162903 A1 | 7/2011 | Stragier |
| 2011/0243759 A1 * | 10/2011 | Ozaki ............... A61M 1/101 417/279 |
| 2011/0254388 A1 * | 10/2011 | Yamasaki ............ B62D 5/0406 310/43 |
| 2011/0293450 A1 * | 12/2011 | Grimes ............... F04B 17/03 417/420 |
| 2011/0303049 A1 | 12/2011 | Neelakantan et al. |
| 2012/0010780 A1 | 1/2012 | Hayashi et al. |
| 2012/0055745 A1 | 3/2012 | Buettner et al. |
| 2012/0078470 A1 | 3/2012 | Hirao et al. |
| 2012/0161590 A1 * | 6/2012 | Yamasaki ............ H02K 5/225 310/68 B |
| 2012/0181757 A1 | 7/2012 | Oteman et al. |
| 2012/0230850 A1 | 9/2012 | Kawano et al. |
| 2012/0305347 A1 | 12/2012 | Mori et al. |
| 2013/0147205 A1 | 6/2013 | Tucker et al. |
| 2013/0154280 A1 | 6/2013 | Wendell et al. |
| 2013/0221625 A1 | 8/2013 | Pare et al. |
| 2013/0264158 A1 | 10/2013 | Hall |
| 2014/0030122 A1 * | 1/2014 | Ozaki ............... H02K 5/1282 417/410.1 |
| 2014/0095022 A1 | 4/2014 | Cashman et al. |
| 2014/0260233 A1 | 9/2014 | Giovanardi et al. |
| 2014/0265169 A1 | 9/2014 | Giovanardi et al. |
| 2014/0265170 A1 | 9/2014 | Giovanardi et al. |
| 2014/0271066 A1 | 9/2014 | Hou |
| 2014/0288776 A1 | 9/2014 | Anderson et al. |
| 2014/0294601 A1 | 10/2014 | O'Shea et al. |
| 2014/0297113 A1 | 10/2014 | Zuckerman et al. |
| 2014/0297116 A1 | 10/2014 | Anderson et al. |
| 2014/0297117 A1 | 10/2014 | Near et al. |
| 2014/0297119 A1 | 10/2014 | Giovanardi et al. |
| 2014/0346783 A1 | 11/2014 | Anderson et al. |
| 2015/0224845 A1 | 8/2015 | Anderson et al. |
| 2015/0316039 A1 | 11/2015 | Tucker et al. |
| 2015/0343874 A1 * | 12/2015 | Kurata ............ B60G 17/0195 701/29.1 |
| 2016/0031285 A1 | 2/2016 | Tucker et al. |
| 2016/0059664 A1 | 3/2016 | Tucker et al. |
| 2016/0114643 A1 | 4/2016 | Anderson et al. |

FOREIGN PATENT DOCUMENTS

| | | |
|---|---|---|
| CN | 2707546 Y | 7/2005 |
| CN | 101104381 A | 1/2008 |
| CN | 201002520 Y | 1/2008 |
| DE | 3937987 A1 | 5/1991 |
| DE | 195 35 752 A1 | 3/1997 |
| EP | 1878598 | 1/2008 |
| EP | 2 541 070 A1 | 1/2013 |
| FR | 2152111 A | 4/1973 |

(56) References Cited

FOREIGN PATENT DOCUMENTS

| | | |
|---|---|---|
| FR | 2346176 A | 10/1977 |
| FR | 2661643 A1 | 11/1991 |
| GB | 652732 | 5/1951 |
| GB | 1070783 | 6/1967 |
| JP | S59-187124 A | 10/1984 |
| JP | H3-123981 U1 | 12/1991 |
| JP | H05-50195 U | 7/1993 |
| JP | 8-226377 A2 | 9/1996 |
| JP | 2001-311452 A | 9/2001 |
| JP | 2003/035254 | 2/2003 |
| JP | 2005-521820 | 7/2005 |
| JP | 2008-536470 A | 9/2008 |
| WO | WO 97/26145 A | 7/1997 |
| WO | WO 2007/071362 A1 | 6/2007 |
| WO | WO 2010/066416 A1 | 6/2010 |
| WO | WO 2011/159874 A2 | 12/2011 |
| WO | WO 2012/167316 A1 | 12/2012 |

OTHER PUBLICATIONS

U.S. Appl. No. 14/602,463, filed Jan. 22, 2015, Anderson et al.
U.S. Appl. No. 14/681,630, filed Apr. 8, 2015, Tucker et al.
PCT/US2014/029654, Aug. 14, 2014, Invitation to Pay Additional Fes.
PCT/US2014/029654, Oct. 29, 2014, International Search Report and Written Opinion.
U.S. Appl. No. 14/212,238, filed Mar. 14, 2014, Giovanardi et al.
U.S. Appl. No. 14/212,359, filed Mar. 14, 2014, Giovanardi et al.
U.S. Appl. No. 14/212,443, filed Mar. 14, 2014, Giovanardi et al.
U.S. Appl. No. 14/213,860, filed Mar. 14, 2014, Anderson et al.
U.S. Appl. No. 14/212,521, filed Mar. 14, 2014, Giovanardi et al.
U.S. Appl. No. 14/242,612, filed Apr. 1, 2014, Tucker et al.
U.S. Appl. No. 14/242,658, filed Apr. 1, 2014, Zuckerman et al.
U.S. Appl. No. 14/242,691, filed Apr. 1, 2014, Anderson et al.
U.S. Appl. No. 14/242,705, filed Apr. 1, 2014, Near et al.
U.S. Appl. No. 14/242,715, filed Apr. 1, 2014, Giovanardi et al.
PCT/US2009/040749, Jul. 15, 2009, International Search Report and Written Opinion.
PCT/US2009/040749, Oct. 28, 2010, International Preliminary Report on Patentability.
PCT/US2010/002116, Feb. 16, 2012, International Preliminary Report on Patentability.
PCT/US2010/002116, Oct. 28, 2010, International Search Report and Written Opinion.
PCT/US2010/002105, Mar. 8, 2012, International Preliminary Report on Patentability.
PCT/US2010/0002105, Dec. 30, 2011, International Search Report and Written Opinion.
PCT/US2011/040654, Oct. 26, 2011, Invitation to Pay Additional Fees.
PCT/US2011/040654, Jan. 3, 2013, International Preliminary Report on Patentability.
PCT/US2011/040654, Jan. 27, 2012, International Search Report and Written Opinion.
Japanese Office Action for Application No. 2011-505190 dated Sep. 24, 2013.
Chinese Search Report for Application No. 201080041636.0 dated Nov. 5, 2013.
Chinese Search Report for Application No. 201080041636.0 dated Oct. 22, 2013.
U.S. Appl. No. 14/750,357, filed Jun. 25, 2015, Giarratana et al.
U.S. Appl. No. 14/777,068, filed Sep. 15, 2015, Tucker et al.
U.S. Appl. No. 14/786,414, filed Oct. 22, 2015, Tucker et al.
U.S. Appl. No. 14/800,201, filed Jul. 15, 2015, Giarratana et al.
U.S. Appl. No. 14/801,787, filed Jul. 16, 2015, Tucker et al.
U.S. Appl. No. 14/859,892, filed Sep. 21, 2015, Anderson et al.
U.S. Appl. No. 14/876,796, filed Oct. 6, 2015, Zuckerman et al.
U.S. Appl. No. 14/989,725, filed Jan. 6, 2016, Anderson et al.
Vandersmissen, ACOCAR active suspension. Vehicle Dynamics Expo. Stuttgart, Jul. 5, 2008. 24 pages.
Vandersmissen et al., The new Tenneco ACOCAR active suspension. Vehicle Dynamics Expo. Stuttgart, Jun. 22-24, 2010. 19 pages.
Cleasby et al., A novel high efficiency electrohydrostatic flight simulator motion system. Fluid Pow Mot Control. Centre for PTMC, UK. 2008;437-449.
Shen et al., Automative electric power and energy mangement—a system approach. Business Briefing: Global Automotive Manufacturing and Technology. 2003:1-5.
[No Author Listed] Ride control innovation, accelerated$^{SM}$. Forward thinking. Forward moving. ACOCAR. Tenneco. Sep. 2011.

* cited by examiner

CONTACTLESS SENSING OF A FLUID-IMMERSED ELECTRIC MOTOR

CROSS-REFERENCE TO RELATED APPLICATIONS

This application is a continuation of International Application PCT/US2014/029654, entitled "ACTIVE VEHICLE SUSPENSION IMPROVEMENTS", filed Mar. 14, 2014, which claims the benefit under 35 U.S.C. § 119(e) of U.S. provisional application Ser. No. 61/913,644, entitled "WIDE BAND HYDRAULIC RIPPLE NOISE BUFFER", filed Dec. 9, 2013, U.S. provisional application Ser. No. 61/865,970, entitled "MULTI-PATH FLUID DIVERTER VALVE", filed Aug. 14, 2013, U.S. provisional application Ser. No. 61/815,251, entitled "ACTIVE SUSPENSION", filed Apr. 23, 2013, and U.S. provisional application Ser. No. 61/789,600, entitled "ACTIVE SUSPENSION", filed Mar. 15, 2013, the disclosures of which are incorporated by reference in their entirety. This application also claims the benefit under 35 U.S.C. § 119(e) of U.S. provisional application Ser. No. 61/930,452, entitled "ELECTROHYDRAULIC SYSTEMS", filed Jan. 22, 2014, the disclosure of which is incorporated by reference in its entirety.

FIELD

Disclosed embodiments are related to contactless sensing of brushless D.C. (BLDC) motor/generator rotors through a diaphragm, including for use in active suspension systems.

BACKGROUND

An integrated Hall effect sensor-based pump is known in the art, and may include an integrated pump motor and controller assembly. Such pumps are often employed in fields of facilities management and the like.

Figure 1:
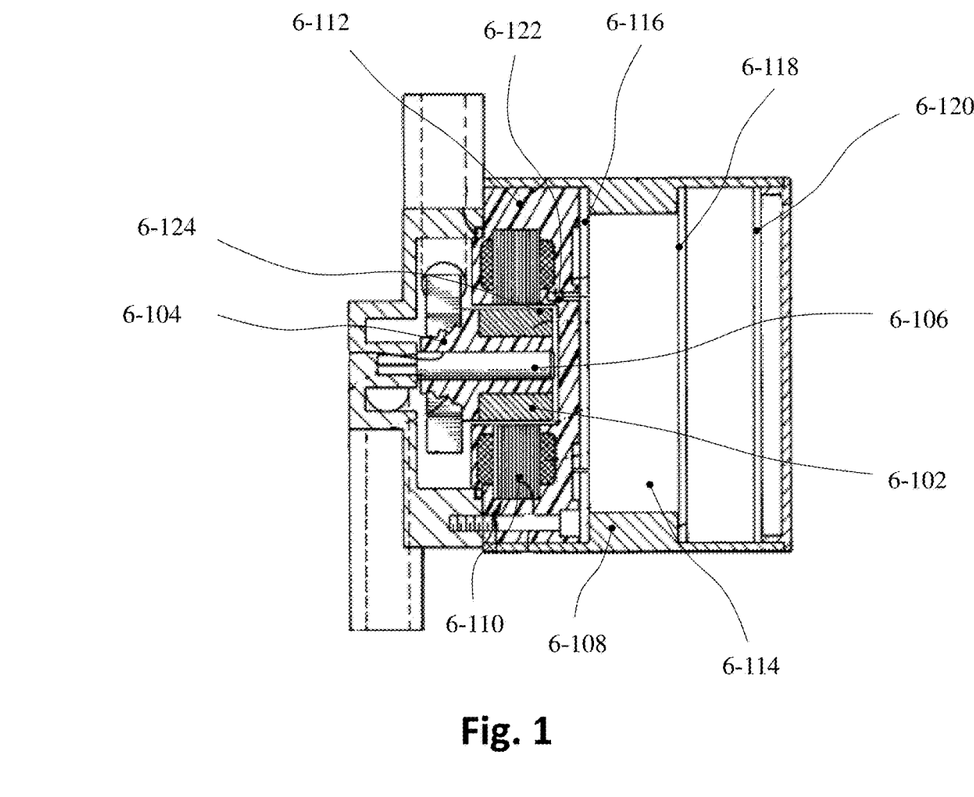
FIG. 1 is a cross section of an integrated pump motor and controller assembly in accordance with the prior art.

Referring to the prior art of the integrated pump motor and controller of FIG. 1, the BLDC motor rotor 6-102 and pump 6-104 are located on a common shaft 6-106, housed in a fluid filled housing 6-108. The BLDC motor stator and windings 6-110 are encased in a molded EPOXY body 6-112 that is located in the housing 6-108. The body 6-112 serves to seal the fluid in the housing 6-108 from the controller cavity 6-114. The BLDC motor controller circuit boards 6-116, 6-118 and 6-120 are supported in the controller cavity 6-114. A plurality of Hall effect sensors 6-122 are encased in the molded EPOXY body 6-112. The Hall effect sensors 6-122 are symmetrically arranged with respect to the axis of rotation of the rotor 6-102. Each sensor 6-122 is fitted and securely mounted within the molded EPOXY body 6-112 and appropriately positioned for measuring the angular position of the rotor. The sensors are wired together to generate a series of pulses (TACH signal) indicative of the speed of rotation. The operation of such sensors, as well as their application to the measurement of speed of rotation of a rotor within a switching electrical field, are well understood by those skilled in the art. Encasing the sensors within the body serves to protect the sensors from the fluid environment while allowing for correct position reading of the rotor magnets 6-124.

Current rotary position sensors, such as Hall effect sensors, are sensitive devices that often cannot be subjected to hydraulic fluid under pressure. It is therefore necessary to shield the rotary sensor from the hydraulic fluid pressure while not impeding its ability to accurately sense position. It is common practice to use three Hall effect sensors disposed radially around the axis of rotation of the motor rotor and a 4-pole ring magnet that is axially located after the rotor magnets. This arrangement may yield a resolution of about 30° and does not provide an absolute position. This may be an adequate resolution for certain applications, but to provide accurate control and responsiveness of a high speed, high precision application, such as an active suspension application in a vehicle, a much finer resolution is required. Although it is possible to use more than three Hall effect sensors disposed radially around the axis of rotation, there becomes a limit to how many can be located, due to their physical size, as well as other constraints such as cost and complexity of connecting many sensors to a controller, and the like. As such this method of position sensing becomes impractical for applications that require fine position sensing resolution and/or absolute position sensing, such as in the application of sensing rotor position for active suspension actuators.

Another drawback of the prior art described above is that in order for the Hall effect sensor(s) to accurately sense the position of the source magnet (or ring magnet) it is typical for the source magnet (or ring magnet) to protrude beyond the length of the stator and stator windings, so that magnetic flux from the rotor magnets and stator windings do not interfere the flux from the source magnet (or ring magnet) and hence disturb the Hall effect sensor(s). This has the effect of increasing the length and the inertia of the rotor in order to support the source magnet (or ring magnet). Certain applications of motor use (such as that of an active suspension actuator, whereby rapid motor accelerations and reversals are experienced), are very sensitive to the inertia of the motor rotor, and increasing the length (and hence inertia) of the rotor to accommodate the Hall effect sensors, without any increase of motor torque, may not be desirable in such applications.

SUMMARY

Aspects of this disclosure relate to a method and system for measuring rotor position or velocity in an electric motor disposed in hydraulic fluid. The methods and systems disclosed herein may comprise a contactless position sensor that measures electric motor rotor position via magnetic, optical, or other means through a diaphragm that is permeable to the sensing means but impervious to the hydraulic fluid. According to one aspect there are provided a housing containing hydraulic fluid, an electric motor immersed in the fluid in the housing, wherein the electric motor comprises a rotatable portion that includes a sensor target element, a diaphragm that is impervious to the hydraulic fluid that separates the hydraulic fluid in the housing from a sensing compartment, and a position sensor located in the sensing compartment, wherein the diaphragm permits sensing of the sensor target element by the position sensor. According to another aspect the position sensor is a contactless sensor, wherein the position sensor is at least one of an absolute position and a relative position sensor, wherein the position sensor is a contactless magnetic sensor. According to another aspect the position sensor may be a Hall effect detector, and the sensor target element may be adapted to be detectable by the position detector and the diaphragm comprises a non-magnetic material. In some embodiments of the system the position sensor may be an array of Hall effect sensors and wherein the Hall effect sensors are sensitive to magnetic field in the axial direction with respect to the rotatable portion of the electric motor. In some embodiments of the system the sensor target element may be a diametrically magnetized two-pole magnet. In some embodiments of the system the magnet does not need to be aligned in manufacturing. According to another aspect the position sensor may be a metal detector, the sensor target element may be adapted to be detectable by the metal detector and the diaphragm comprises a non-magnetic material. According to another aspect the position sensor may be an optical detector, the sensor target element may be adapted to be detectable by the optical detector and the diaphragm comprises a translucent region that may be disposed in an optical path between the optical detector and the portion of the rotatable portion that comprises the sensor target element. According to another aspect the position sensor may be a radio frequency detector and the sensor target element may be adapted to be detectable by the position detector. According to another aspect the position sensor may be tolerant of at least one of variation in air gap between the sensor target element and the position sensor, pressure of the hydraulic fluid, temperature of the hydraulic fluid, and external magnetic fields. According to another aspect the system comprises a fluid filled housing wherein the fluid in the housing may be pressurized, wherein the pressure in the fluid filled housing exceeds an operable pressure limit of the position sensor.

According to another aspect a system of electric motor rotor position sensing, comprises an active suspension system in a vehicle between a wheel mount and a vehicle body, wherein the active suspension system comprises an actuator body, a hydraulic pump, and an electric motor coupled to the hydraulic pump immersed in hydraulic fluid. In some embodiments of the system the electric motor comprises a rotor with a sensor target element, the rotation of which may be detectable by contactless position sensor, and a diaphragm that isolates the contactless position sensor from the hydraulic fluid while facilitating disposing the contactless position sensor in close proximity to the sensor target element. In some embodiments of the system further comprises of a plurality of sensors, an energy source and a controller that senses wheel and body events through the plurality of sensors, senses the rotor rotational position with the position sensor and in response thereto sources energy from the energy source for use by the electric motor to control the active suspension, wherein the response to the position sensor comprises commutation of an electric BLDC motor to create at least one of a torque and velocity characteristic in the motor. In some embodiments of the system creating at least one of a torque and velocity characteristic in the motor creates a force from the active suspension system. In some embodiments of the system the response to the position sensor comprises a vehicle dynamics algorithm that uses at least one of rotor velocity, active suspension actuator velocity, actuator position, actuator velocity, wheel velocity, wheel acceleration, and wheel position, wherein such value may be calculated as a function of the rotor rotational position. In some embodiments of the system the response to the position sensor comprises a hydraulic ripple cancellation algorithm.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

In certain applications, an electric motor is used to provide torque and speed to a hydraulic pump to provide force and velocity to a hydraulic actuator, and conversely, the hydraulic pump may be used as a motor to be used to back-drive the electric motor as a generator to produce electricity from the force and velocity inputted into the actuator.

For reasons of performance and durability, these electric motors are of the BLDC type and may be mounted inside a housing, close coupled with the pump, where they may be encased in the working fluid under high pressure. In order to provide adequate hydraulic system performance, accurate control of the torque and speed of the BLDC motor is required, which may require a rotary position sensor for commutation. Although rotary position sensors for BLDC motor commutation/control currently exist, certain applications, such as the use in active suspension actuators or high performance aerospace actuators, for example, are particularly challenging due to the fact that the BLDC motor may be mounted inside a housing, where it is encased in the working fluid under high pressures.

An electric motor/generator may be applied in an active suspension system to work cooperatively with a hydraulic motor to control movement of a damper in a vehicle wheel suspension actuator. The electric generator may be co-axially disposed and close coupled with the hydraulic motor, and it may generate electricity in response to the rotation of the hydraulic motor, while also facilitating rotational control of the hydraulic motor by applying torque to deliver robust suspension performance over a wide range of speeds and accelerations. It may be desirable to precisely control the electric motor/generator. To achieve precise control, precise rotor position information may be needed. In particular, determining the position of the rotor relative to the stator (the windings) is important to precisely control currents passing through the windings based on the rotor position for commutation. To precisely and dynamically control the currents through the windings (depending on where the rotor is in its rotation, what direction it is turning, its velocity, and acceleration), a fairly precise reading of rotor position is required. To achieve precisely determining the rotor position, a sensor is used. By applying position determination algorithms that are described below, a low cost sensor (e.g. with accuracy of one degree) may be used. Rotor position may also be used for a variety of reasons other than that for commutation. For example, position may be used for determining fluid flow velocity from the coupled hydraulic motor. Also, the motor controller may be applied in an active suspension that senses wheel and body events through sensors, such as a position sensor or body accelerometer, etc., and senses the rotational position of the rotor with the position sensor and in response thereto sources energy from the energy source for use by the electric motor to control the active suspension. In embodiments the response to the position sensor comprises a vehicle dynamics algorithm that uses at least one of rotor velocity, active suspension actuator velocity, actuator position, actuator velocity, wheel velocity, wheel acceleration, and wheel position, wherein such value is calculated as a function of the rotor rotational position. Another such use of the rotary position sensor may be for the use in a hydraulic ripple cancellation algorithm; positive displacement hydraulic pumps and motors typically produce a pressure pulsation, or ripple, that is in relation to its rotational position. This pressure pulsation can produce undesirable noise and force pulsations in downstream actuators, etc. Since the profile of the pressure pulsation can be determined relative to the pump position, and hence the rotor and hence the source magnet position, it is possible for the controller to use an algorithm that can vary the motor current and hence the motor torque based upon the rotor position signal to counteract the pressure pulsations, thereby mitigating or reducing the pressure pulsations, reducing the hydraulic noise and improving the performance of the system.

In some configurations described herein, portions of the BLDC motor (or the complete BLDC motor) may be submerged in hydraulic fluid. This may present challenges to sensing a precise position of the rotor. Therefore, a magnetic target (source magnet) attached on the rotor shaft may be detected by a sensor disposed so that it is isolated from the hydraulic fluid. One such arrangement may include disposing a sensor on a dry side of a diaphragm that separates the fluid from the sensor. Because magnetic flux passes through various materials, such as a nylon, plastic or aluminum etc., it is possible to use such materials for a diaphragm so that the sensor can read the rotor position while keeping the sensor out of the fluid. While a low cost magnetic sensor may provide one-degree resolution with one to two degrees of linearity, which may be sufficient simply for determining rotor position, to precisely control the currents flowing through the windings, additional information about the rotor may be needed, such as acceleration of the rotor. One approach would be to use a more accurate sensor, although this increases costs and may not even be practical when the rotor is immersed in fluid. Therefore, a filter that correlates velocity with position may be utilized. The filter may perform notch filtering with interpolation of any filtered positions. By performing notch filtering, harmonics of the filtered frequency are also filtered out, thereby improving results. By using a combination of filtering, pattern sensing, and on-line auto-calibration, precise calibration steps during production or deployment are eliminated, thereby reducing cost, complexity, and service issues. Methods and systems of rotor position sensing may include magnetically sensing electric generator rotor position of a fluid immersed electric generator shaft through a diaphragm. Other methods and systems may include processing the sensed position data to determine rotor acceleration with a low-cost magnetic sensor. Other methods may include processing a series of sensor target detections with at least one of a derivative and integration filter and an algorithm that uses velocity over time to determine position and acceleration of the rotor. Other methods may include detecting the magnetic sensor target each time it passes proximal to the rotary position sensor, resulting in a series of detections that each represent a full rotation of the rotor and then detecting electric motor voltages and/or currents to determine a rotor velocity (as is known in the art of sensorless control of a BLDC motor by measuring the back EMF in the undriven coils to infer the rotor position), then processing the series of detections with an algorithm that calculates rotor position by integrating rotor velocity and resetting absolute position each time the magnetic sensor target passes the magnetic sensor.

By using a single target magnet attached to the center of the rotor shaft the magnet length and the associated 'back iron' of the rotor need only extend to the length required so as to achieve the maximum possible torque of the motor, not extending further so as to provide rotor magnet length for sensing with Hall effect sensors. This will reduce the required inertia of the rotor assembly as compared to prior art approaches. One such arrangement locates the target magnet about the center of the rotor shaft by a non-magnetic, light-weight component that not only allows for the flux of the target magnet to adequately penetrate the non-magnetic diaphragm, but also reduces the rotating inertia of the rotor assembly, thereby improving the responsiveness and performance of the system.

Figure 2:
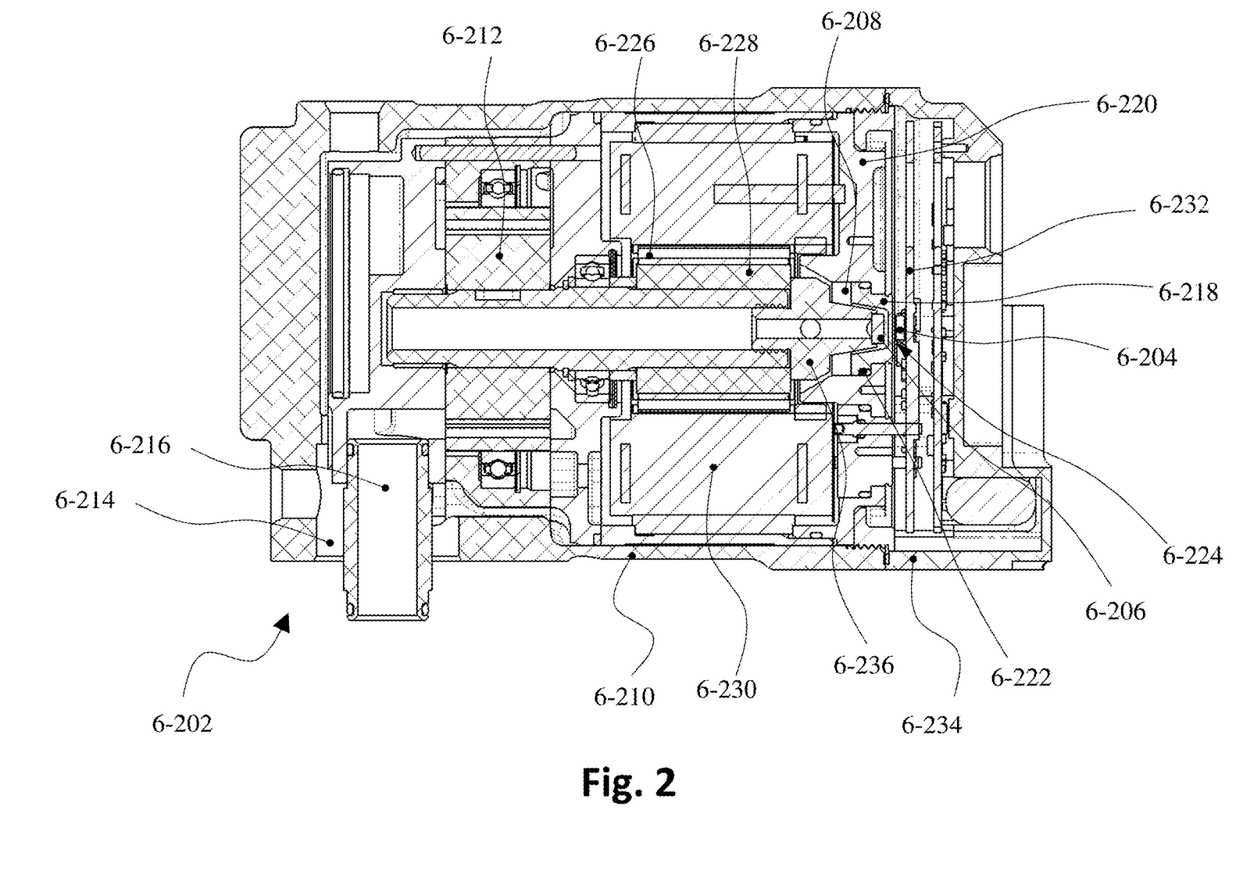
FIG. 2 is a cross section of an integrated pump motor and controller comprising a motor rotor contactless position sensor and controller assembly.
Figure 2A:
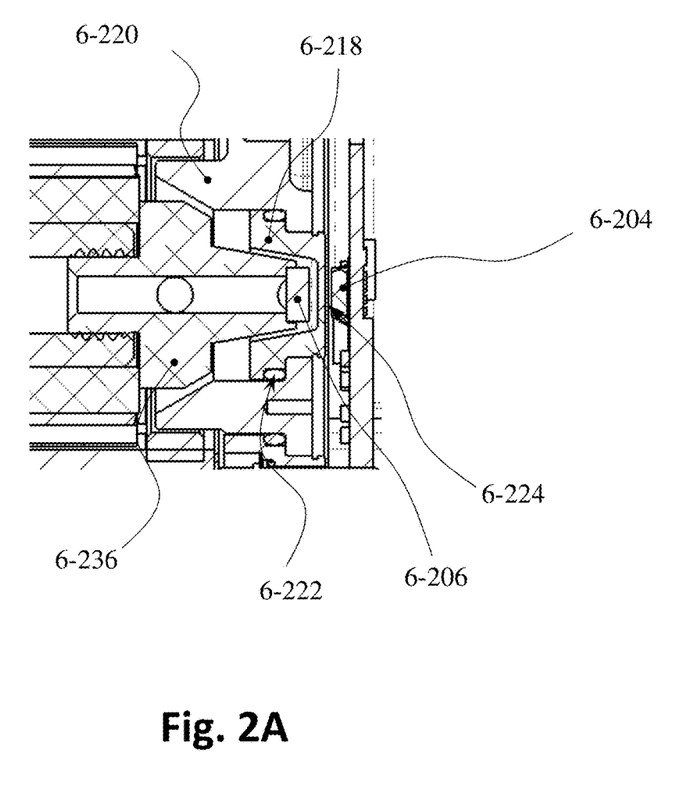
FIG. 2A is a detail view of the BLDC motor rotor position sensor, sensing magnet and diaphragm.

Turning now to the figures, FIGS. 2 and 2A the integrated pump motor and controller comprising a motor rotor position sensor and controller assembly 6-202 is shown. In the embodiment of FIG. 2, a rotary position sensor 6-204, that measures the rotational position of a source magnet 6-206 and is protected from the working hydraulic fluid 6-208 under pressure that is contained within the housing 6-210, is shown. In the embodiment shown, the rotary position sensor may be a contactless type sensor, wherein the rotary position sensor comprises of an array of Hall effect sensors that are sensitive to magnetic flux in the axial direction relative to the axis of rotation of the source magnet and can sense the flux of a diametrically magnetized two-pole source magnet to determine absolute position and a relative position. The array of Hall effect sensors may be connected to an on-board microprocessor that can output the absolute position and a relative position signal as a digital output. This type of sensor allows for a degree of axial compliance of the sensor to the source magnets as well as for radial mis-alignment of the source magnet to the sensor without degrading sensor output performance, thereby allowing the sensor to operate under normal manufacturing tolerances for position and rotation. This type of sensor may comprise of an on-board temperature sensor that can correct for errors due to temperature variance.

In the embodiment shown, the first port 6-214 of the hydraulic pump 6-210 is in fluid connection with the fluid 6-208 that is contained within the housing 6-210 and the first fluid connection port 6-214. Therefore the pressure of the fluid 6-208 is at the same pressure as the first port of the pump 6-212. The second port of the hydraulic pump 6-212 is in fluid connection with the second fluid connection port 6-216. Depending upon the use of the integrated pump motor and controller assembly 6-202, the first and second fluid connection port may the inlet and outlet of the hydraulic pump, and vice versa, and the first and second fluid connection port may be at high or low pressure or vice versa. As such, the fluid 6-208 contained in the housing 6-210 could be at the maximum working pressure of the pump. In certain applications, such as active suspension actuators or aerospace actuators for example, this could reach 150 BAR or above. It is therefore necessary to protect the rotary position sensor 6-204 from such pressures. Although prior teaches that Hall effect sensors can be protected from working system pressure by encasing them in an EPOXY molding for example, this type of arrangement is typically suitable for low pressure systems, as it would be impractical to encapsulate the sensor deep enough inside of the EPOXY molding so that the strain induced upon the relatively week structure of EPOXY did not act upon the sensor resulting in its failure. As such, in the embodiment shown in FIG. 2, the rotary position sensor 6-204 is protected from the pressure of the fluid 6-208 by a sensor shield or diaphragm 6-218. The sensor shield 6-218 is located within a bulkhead 6-220, in front of the sensor. The sensor shield 6-218 is exposed to the pressure of the hydraulic fluid 6-208. As shown in FIG. 2, the sensor shield is sealed to the bulkhead by means of a hydraulic seal 6-222 (although an elastomeric seal is disclosed, a mechanical seal or adhesive etc. may be used, and the technology is not limited in this regard) such that the hydraulic fluid cannot pass by the sensor shield. The bulkhead 6-220 is sealed to the housing 6-210. A small air gap 6-224 exists between the sensor shield and the sensor so that any deflection of the sensor shield, due to the hydraulic fluid pressure acting on it, does not place any load onto the sensor itself. The sensor shield 6-218 is constructed of a non-magnetic material so that the magnetic fluxes of the source magnet 6-206 can pass through the sensor shield unimpeded. The sensor shield may be constructed from many types of non-magnetic material, such as aluminum or an engineered performance plastic etc., and the technology is not limited in this regard. An example of the selection criteria for the sensor shield material being that it is preferably able to contain the pressure of the fluid 6-208 without failure, it preferably does not deflect enough under pressure so that it will contact the rotary position sensor causing failure of the sensor, it preferably does not impede the magnetic flux of the source magnet so as to create sensing errors, and it is preferably cost effective for the application. The rotary position sensor 6-204 may be adequately shielded from other external magnetic fluxes such as that from the magnets 6-226 on the motor rotor 6-228 or from the motor stator windings 6-230, so as not impair its ability to accurately sense the position of the magnetic flux of the source magnet. In the embodiment shown the rotary position sensor 6-204 may be shielded from these disturbing magnetic fluxes by the bulkhead 6-220. The bulkhead 6-220 may be constructed from a material, such as steel, for example, that tends to prevent errant magnetic fluxes from passing through to the rotary position sensor.

In the embodiment shown in FIG. 2, the rotary position sensor 6-204 is mounted directly on the motor controller printed circuit board (PCB) 6-232. The PCB 6-232 is supported in a controller housing 6-234 that forms a sensing compartment that is free from the working fluid 6-208. The source magnet 6-206 may be located in a magnet holder 6-236 that locates the source magnet coaxially with the BLDC motor rotational axis and the rotary position sensor axis, and in close axial proximity to the sensor shield 6-218. The source magnet and magnet holder are operatively connected to the BLDC motor rotor 6-228. In the embodiment shown the magnet holder 6-236 is constructed of a non-magnetic material so as not to disturb the magnetic flux of the source magnet 6-206. In the highly dynamic application of an active suspension actuator, where there are rapid rotational accelerations and reversals of the motor rotor it is preferable to reduce the inertia of the rotating components and for this reason the magnet holder may be constructed of a light weight, non-magnetic material, such as aluminum, or an engineered performance plastic, etc.

Figures 3, 3A:
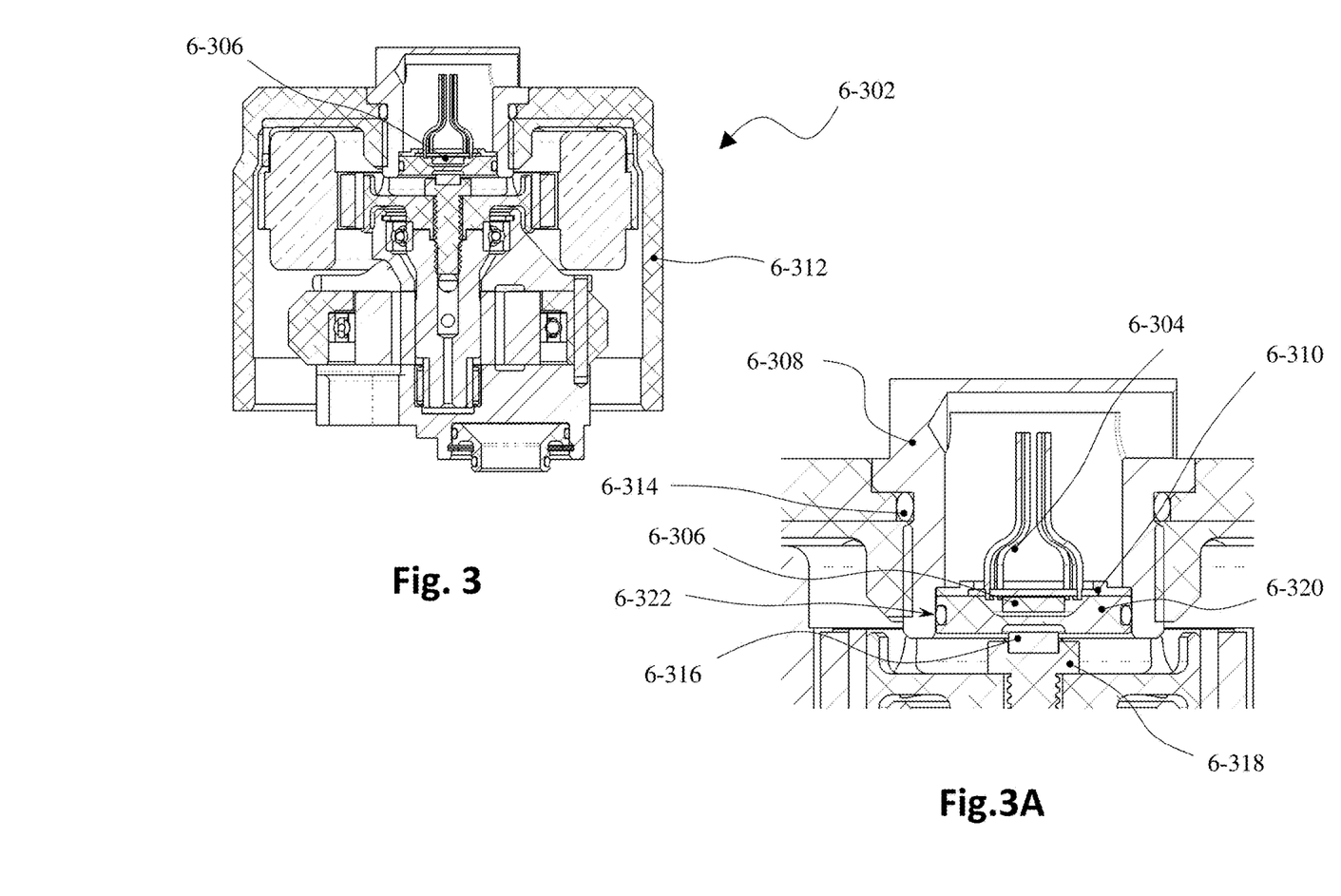
FIG. 3 is a cross section of an alternate embodiment of a hydraulic pump, BLDC motor containing a motor rotor position sensor and controller assembly.
FIG. 3A is a detail view of the alternate embodiment of the BLDC motor rotor position sensor, sensing magnet and diaphragm.

In FIG. 3 an alternative embodiment of an integrated pump motor controller 6-302 is shown. This embodiment is similar to that of the embodiment of FIG. 2 with the exception that the rotary position sensor is mounted remotely from the motor controller PCB, and the sensor is electrically connected to the motor controller via wires 6-304. This arrangement may be advantageous when locating the motor controller in the proximity of the rotary position sensor and source magnet is not practical.

Referring to FIGS. 3 and 3A, a rotary position sensor 6-306 is located in a sensor body 6-308 via a sensor holder 6-310. The sensor body and sensor are held in rigid connection to the housing 6-312, and there is a seal 6-314 between the housing and the sensor body. The sensor body is constructed of a magnetic material (such as steel for example) so as to shield the sensor from external unwanted magnetic fluxes (from the BLDC motor rotor magnets or from the stator windings for example) that may degrade the sensor accuracy. In the embodiment shown, the sensor is located coaxially with the rotational axis of the BLDC motor rotor axis. A source magnet 6-316 is located in a magnet holder 6-318 that locates the source magnet coaxially with the BLDC motor rotational axis and the sensor axis, and in close axial proximity to a sensor shield 6-320. The source magnet and magnet holder are operatively connected to the BLDC motor rotor. The sensor shield is constructed so that it has a thin wall section that allows the face of the source magnet to be located close to the working face of the sensor so as to provide sufficient magnetic flux strength to penetrate the sensor so as to provide accurate position signal. The sensor shield 6-320 is exposed to the pressure of the ambient hydraulic fluid. As shown in FIG. 3A, the sensor shield is sealed to the bulkhead by means of a hydraulic seal 6-322 (although an elastomeric seal is disclosed, a mechanical seal or adhesive etc. could be used, and the technology is not limited in this regard) such that the hydraulic fluid cannot pass by the sensor shield. A small air gap exists between the sensor shield and the sensor so that any deflection of the sensor shield, due to the hydraulic fluid pressure acting on it, does not place a load onto the sensor itself. The sensor shield is constructed of a non-magnetic material so that the magnetic fluxes of the source magnet can pass through the sensor shield unimpeded.

The source magnet holder 6-318 is constructed of a low density, non-magnetic material, such as aluminum or an engineered performance plastic etc. so as not to degrade the source magnetic flux strength and to reduce rotational inertia. The sensor wires 6-304 are sealed to the sensor body (by means of a hydraulic seal, mechanical seal, or adhesive etc.) so as to protect the rotary position sensor from the environment.

Figure 4:
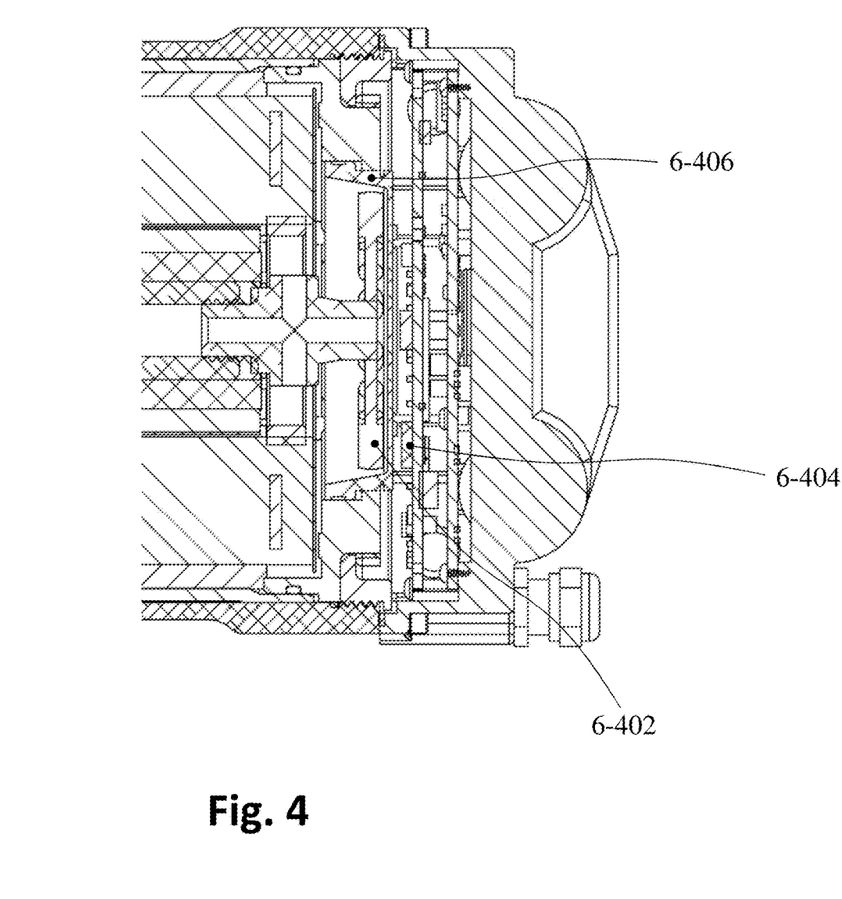
FIG. 4 is a cross section of the integrated pump motor and controller comprising a motor rotor position sensor and controller assembly using an annular type source magnet.

In an alternative embodiment as shown in FIG. 4 the source magnet 6-402 is of an annular type and the rotary position sensor 6-404 is mounted eccentrically to the rotor rotational axis and a and senses the flux of the source magnet 6-402 through the non-magnetic sensor shield 6-406. The functioning and arrangement of this configuration is similar to that as disclosed in the embodiments of FIGS. 2 and 3. This arrangement may be advantageous by offering finer sensing resolution without a significant increase in cost due to the increased number of poles in the annular source magnet.

In an arrangement similar to the embodiment of the Hall effect rotary position sensor shown in FIG. 4, an alternative embodiment is to use an optical rotary position sensor that measures the rotational position of a reflective disc which is protected from the working hydraulic fluid under pressure in a similar manner to that described in the embodiment of FIG. 4, wherein the optical rotary position sensor comprises of a light transmitter/receiver and a reflective disc.

In this embodiment the Hall effect rotary position sensor is replaced by a light transmitter/receiver is mounted onto the controller PCB located off-axis with the rotational axis of the BLDC motor. A sensor shield is located in front of the light transmitter and receiver and is exposed to the hydraulic fluid under pressure in the housing. The sensor shield is sealed such that the hydraulic fluid does not enter the sensor cavity. The sensor shield is constructed of an optically clear material such as an engineered plastic or glass etc., so that the light source can pass through the sensor shield unimpeded. A small air gap exists between the sensor shield and the light transmitter and receiver so that any deflection of the sensor shield, due to the hydraulic fluid pressure acting on it, does not place a load onto the light transmitter and receiver itself. The annular type source magnet as shown in the earlier embodiment FIG. 4 is replaced in this embodiment by reflective disc that is drivingly connected to, and coaxial with, the BLDC motor, and that is located near the light transmitter and receiver so that light emitted from the light transmitter is reflected back to the light receiver via the optically clear sensor shield.

The reflective disc may contain markings so as to produce a reflected light signal as the disc rotates; the light transmitter receiver then reads this signal to determine the BLDC motor position. From this position motor speed and acceleration can also be determined. The wavelength of light source used is such it can pass through the sensor shield, the oil within the valve and any contaminants contained within the oil, unimpeded, so that the light receiver can adequately read the light signal reflected from the reflective disc.

Although the embodiments of FIGS. 2, 3 and 4 refer to an electric motor rotary position sensor for use in certain types integrated electric motors and hydraulic pumps for use in high performance actuators, these embodiments can also be incorporated into any electric motor-hydraulic pump/motor arrangement whereby the electric motor is encased in the working fluid (as in compact hydroelectric power packs etc.), and the inventive methods and systems are not limited in this regard.

Although the embodiments show the use of a rotary Hall effect position sensor and optical rotary position sensor, various other types of rotary position sensor, such as encoders, potentiometers, fiber optic and resolvers etc. may be accommodated in a similar manner, for example the Hall effect rotary position sensor could be replace by a metal detector and the source magnet could be replaced by a an element that is adapted to be detected thru the non-metallic sensor shield or the rotary position sensor could be a radio frequency detector and the sensor target be adapted detectable by the sensor and as such, the patent is not limited in this regard.

As sensor technology progresses, it may be possible to use a rotary position sensor that can withstand a high fluid pressure, temperature environment with external magnetic fields, and as such could be incorporated to sense the rotational position of a suitable sensor target, and the patent is not limited in this regard.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

The invention claimed is:

1. A system comprising;
an active suspension system in a vehicle interposed between a wheel mount and a vehicle body, the active suspension system comprising:
an actuator body;
a hydraulic pump in fluid communication with the actuator body;
a contactless position sensor;
an electric motor at least partially immersed in hydraulic fluid and coupled to the hydraulic pump, the electric motor comprising a rotor with a sensor target wherein the contactless position sensor senses an angular position of the rotor;
a diaphragm that isolates the contactless position sensor from the hydraulic fluid;
an energy source; and
a controller in electrical communication with the contactless position sensor, and wherein the controller sources energy from the energy source for use by the electric motor to control the active suspension at least partially based on the sensed angular position of the rotor.

2. The system of claim 1, wherein the electric motor is a BLDC motor, and wherein in response to the sensed angular position of the rotor the controller commutates the electric motor to create at least one of a torque and velocity characteristic in the motor.

3. The system of claim 2, wherein creating at least one of a torque and velocity characteristic in the motor creates a force from the active suspension system.

4. The system of claim 2, wherein the response to the sensed angular position of the rotor comprises the controller applying a vehicle dynamics algorithm that uses at least one of rotor velocity, active suspension actuator velocity, actuator position, actuator velocity, wheel velocity, wheel acceleration, and wheel position to control operation of the electric motor using the sensed angular position of the rotor.

5. The system of claim 2, wherein the response to the sensed angular position of the rotor comprises the controller applying a hydraulic ripple cancellation algorithm to control operation of the electric motor using the sensed angular position of the rotor.

* * * * *